United States Patent
Cable

(10) Patent No.: US 8,838,669 B2
(45) Date of Patent: Sep. 16, 2014

(54) SYSTEM AND METHOD FOR LAYERED APPLICATION SERVER PROCESSING

(75) Inventor: Laurence Paul Gildea Cable, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 878 days.

(21) Appl. No.: 12/366,564

(22) Filed: Feb. 5, 2009

(65) Prior Publication Data
US 2009/0271498 A1     Oct. 29, 2009

Related U.S. Application Data

(60) Provisional application No. 61/027,306, filed on Feb. 8, 2008.

(51) Int. Cl.
   *G06F 15/16*     (2006.01)
   *H04L 29/08*     (2006.01)

(52) U.S. Cl.
   CPC ... *H04L 29/08135* (2013.01); *Y10S 707/99932* (2013.01); *Y10S 707/99931* (2013.01)
   USPC ............ 709/201; 707/999.002; 707/999.001; 340/572.1; 379/93.02

(58) Field of Classification Search
   CPC ............... H04L 29/08135; H04L 29/08144; H04L 29/08072; H04L 29/0809; H04L 12/22; G06F 17/30595; H04M 3/382
   USPC ................................................ 709/219, 201
See application file for complete search history.

(56) References Cited

U.S. PATENT DOCUMENTS

| | | | |
|---|---|---|---|
| 7,610,266 B2 * | 10/2009 | Cascaval et al. | 1/1 |
| 2003/0074342 A1 * | 4/2003 | Curtis | 707/1 |
| 2003/0093528 A1 | 5/2003 | Rolia | |
| 2003/0212898 A1 | 11/2003 | Steele | |
| 2004/0045014 A1 * | 3/2004 | Radhakrishnan | 719/328 |
| 2004/0117476 A1 | 6/2004 | Steele | |
| 2005/0015430 A1 | 1/2005 | Rothman | |
| 2005/0188088 A1 | 8/2005 | Fellenstein | |

(Continued)

OTHER PUBLICATIONS

Fujitsu Siemens "The Server Solution with Unique Flexibility for Your Data Center", PRIMERGY BladeFrame, http://www.fujitsu-siemens.com/Resources/230/1041820968.pdf, 12 pages.

(Continued)

*Primary Examiner* — Phuoc Nguyen
*Assistant Examiner* — Kishin G Belani
(74) *Attorney, Agent, or Firm* — Meyer IP Law Group

(57) ABSTRACT

A system and method for layered application server processing. Embodiments of the system are particularly useful in extreme transaction processing (XTP) environments to support hundreds of thousands of simultaneous users, and perhaps millions of simultaneous transactions. Applications can be built from service components. Mashups can be performed on applications, services, and data, to create a more dynamic form of application. Data center consolidation and server virtualization techniques can be used to distribute applications over multiple machines or data centers. A horizontal Operating System (OS) fabric is then used to integrate components of the data centers in a dynamic fashion, including for example integrating portal or Service Component Architecture (SCA) components into personality profiles that can be federated over many (e.g. thousands) of Java machines and data centers. The net result is that the system can be quickly and dynamically modified or distributed over different machines and different applications, even over distances of different continents, to respond to the immediate needs of the enterprise.

17 Claims, 7 Drawing Sheets

(56) References Cited

U.S. PATENT DOCUMENTS

| | | | |
|---|---|---|---|
| 2006/0271544 | A1 | 11/2006 | Devarakonda |
| 2007/0112574 | A1* | 5/2007 | Greene .............................. 705/1 |
| 2009/0006870 | A1* | 1/2009 | Duri et al. .................... 713/193 |
| 2009/0175426 | A1* | 7/2009 | Beyer et al. ................ 379/93.02 |

OTHER PUBLICATIONS

Graupner, "Resource-Sharing and Service Deployment in Virtual Data Centers", IEEE Computer Society, 2002, 6 pages.

Devarakonda, et al. Policy-Based Multi-Datacenter Resource Management, IBM Research, 2003, http://www.sics.se/policy2005/Policy_Pres3/MultiDataCenter/20Policy202005/20Presentation.ppt., 13 pages.

Lambert, "Dynamic Resource Sharing Transforms Data Center Design", http://www.xchangemag.com/articles/231datacentersolutions/html., Mar. 1, 2002, 2 pages.

IT@Intel Brief, "Virtualizing the Data Center", http://www.dcs.bbk.ac.uk/~geoff/virtualizing-the-data-center.pdf., Mar. 2007, 4 pages.

IBM Websphere Software, "Extending Virtualization in the Data Center with Application Infrastructure Virtualization", ftp://ftp.software.ibm.com/software/webservers/appserv/WebSphere_Virtual_Enterprise_wp.pdf, Apr. 2008, 16 pages.

Altmann, "A Model for Resource Sharing for Internet Data Center Providers Within the Grid", http://it.i-u.de/schools/altmann/publicaions/gecon_2004_v06_altmann.pdf, 6 pages.

AKORRI Managing the Virtualized Data Center, "Data Center Optimization by Managing the Virtual Infrastructure", http://www.akorri.com/business-impact-manage-virtual-infrastructure.htm., 1 page.

VMware Infrastructure, "Transform IT Infrastructure with Enterprise-Class Virtualization", http://www.vmware.com/products/vi, 3 pages.

* cited by examiner

SYSTEM AND METHOD FOR LAYERED APPLICATION SERVER PROCESSING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to application servers, and distributed computing, and is particularly related to a system and method for layered application server processing.

BACKGROUND

Enterprise software systems are used by large organizations to run complex mission-critical applications. A typical enterprise software system may use an application server, often in combination with other transaction processing and database components, to support large numbers of simultaneous users, applications, and transactions. Of increasing importance are enterprise systems that employ extreme transaction processing (XTP) to handle hundreds of thousands of simultaneous users, and perhaps millions of simultaneous transactions. Examples of XTP applications include online commerce, advanced business markets, global communications, and virtual world environments. Other enterprise systems have gradually moved away from legacy or silo-based applications toward a service oriented architecture (SOA).

Generally, application server products have been provided as one of two models: either an open source, freely available, collection of compatible products, such as open source Java J2EE products that can be assembled and configured to suit an enterprise' needs; or as a stack of products, such as Microsoft's .Net product, that bundles together a variety of components into a low cost stack. Whichever model is chosen, it is important for any enterprise that its software solution supports mission critical applications, and be reliable, scalable, highly-available, high performing, and easy to manage from the perspective of the system itself and the applications that will run thereon. The above approaches represent a compromise between the programming model and the enterprise-wide mission critical environment. However, neither approach is ideal in addressing both sides of this equation. This is the general area that embodiments of the present invention are designed to address.

SUMMARY

Disclosed herein is a service oriented middleware system that can be used in enterprise class environments. Embodiments of the system are particularly useful in extreme transaction processing (XTP) environments. In accordance with various embodiments the system also allows an enterprise to move away from legacy or silo-based applications, and move instead toward service oriented architecture (SOA) type applications. Applications can be built from service components. Mashups can also be performed on applications, services, and data, to create a new and more dynamic form of application. In accordance with an embodiment, data center consolidation and server virtualization techniques can be used to distribute applications over multiple machines or data centers. These data centers and Java machines can be configured to wait for work or other allocations. The net result of this is that the system can be quickly and dynamically modified or distributed over different machines and different applications, even over distances of different continents, to respond to the immediate needs of the enterprise. These and other advantages will be evident from the following description and claims.

DETAILED DESCRIPTION

Disclosed herein is a service oriented middleware system that can be used in enterprise class environments. Embodiments of the system are particularly useful in extreme transaction processing (XTP) environments. In such environments the system is expected to handle hundreds of thousands of simultaneous users, and perhaps millions of simultaneous transactions. Examples of XTP applications can include online commerce, advanced business markets, global communications, and virtual world environments. In accordance with various embodiments the system also allows an enterprise to move away from legacy or silo-based applications, and move instead toward service oriented architecture (SOA) type applications. Applications can be built from service components. Mashups can also be performed on applications, services, and data, to create a new and more dynamic form of application.

In accordance with an embodiment, data center consolidation and server virtualization techniques (such as those described in copending patent application "SYSTEM AND METHOD FOR PROVIDING HARDWARE VIRTUALIZATION IN A VIRTUAL MACHINE ENVIRONMENT", Inventor Joakim Dahlsted; application Ser. No. 11/835,307; filed Aug. 7, 2007, and herein incorporated by reference) can be used to distribute applications over multiple machines or data centers. A horizontal Operating System (OS) fabric is then used to integrate components of the data centers in a dynamic fashion, including for example integrating portal or Service Component Architecture (SCA) components into personality profiles that can be federated over many (e.g. thousands) of Java machines and data centers. These data centers and Java machines can be configured to wait for work or other allocations. The net result of this is that the system can be quickly and dynamically modified or distributed over different machines and different applications, even over distances of different continents, to respond to the immediate needs of the enterprise, which also results in being able to perform necessary tasks with overall fewer numbers of machines.

Figure 1:
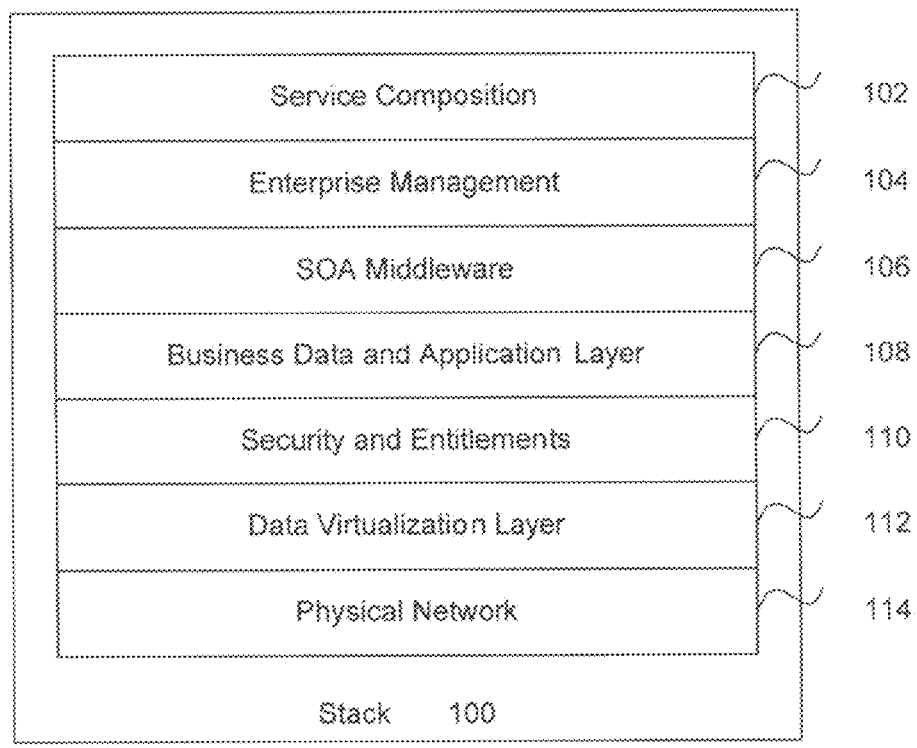
FIG. 1 shows an illustration of a typical application server stack.

FIG. 1 shows an illustration of a typical application server stack. As shown in FIG. 1, a typical Stack 100 includes a Service Composition layer 102, Enterprise Management layer 104, SOA Middleware layer 106, Business Data and Application layer 108, Security and Entitlements layer 110, Data Virtualization layer 112, and Physical Network 114. Examples of such application server stack include the traditional WebLogic and Aqualogic suite of products from BEA Systems, Inc., San Jose, Calif.

Figure 2:
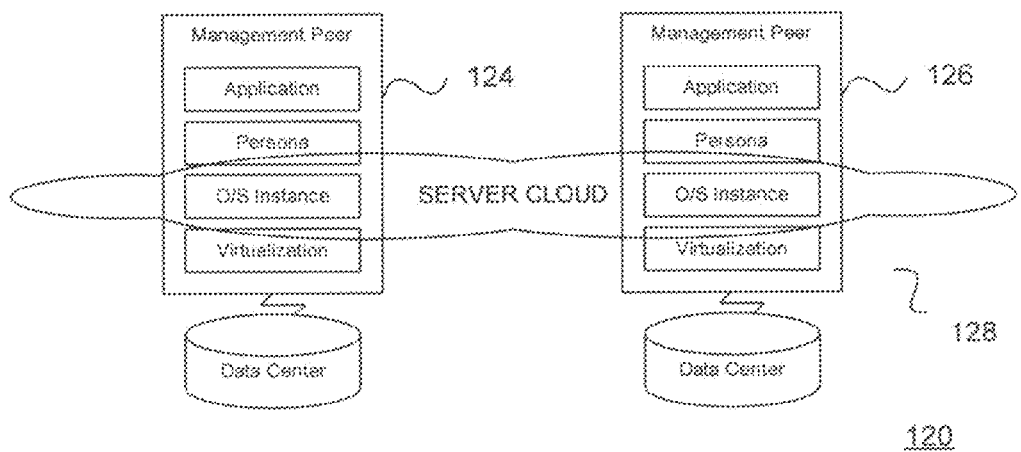
FIG. 2 shows an illustration of a layered application server environment including one or more data sources in accordance with an embodiment.

FIG. 2 shows an illustration of a layered application server environment 120 including one or more data sources in accordance with an embodiment. As shown in FIG. 2, each of a plurality of peer computers 124, 126 are provided with virtualization, operating system (O/S), persona, and application layers. This allows the plurality of computers to provide a server cloud 128 for the processing of applications.

Figure 3:
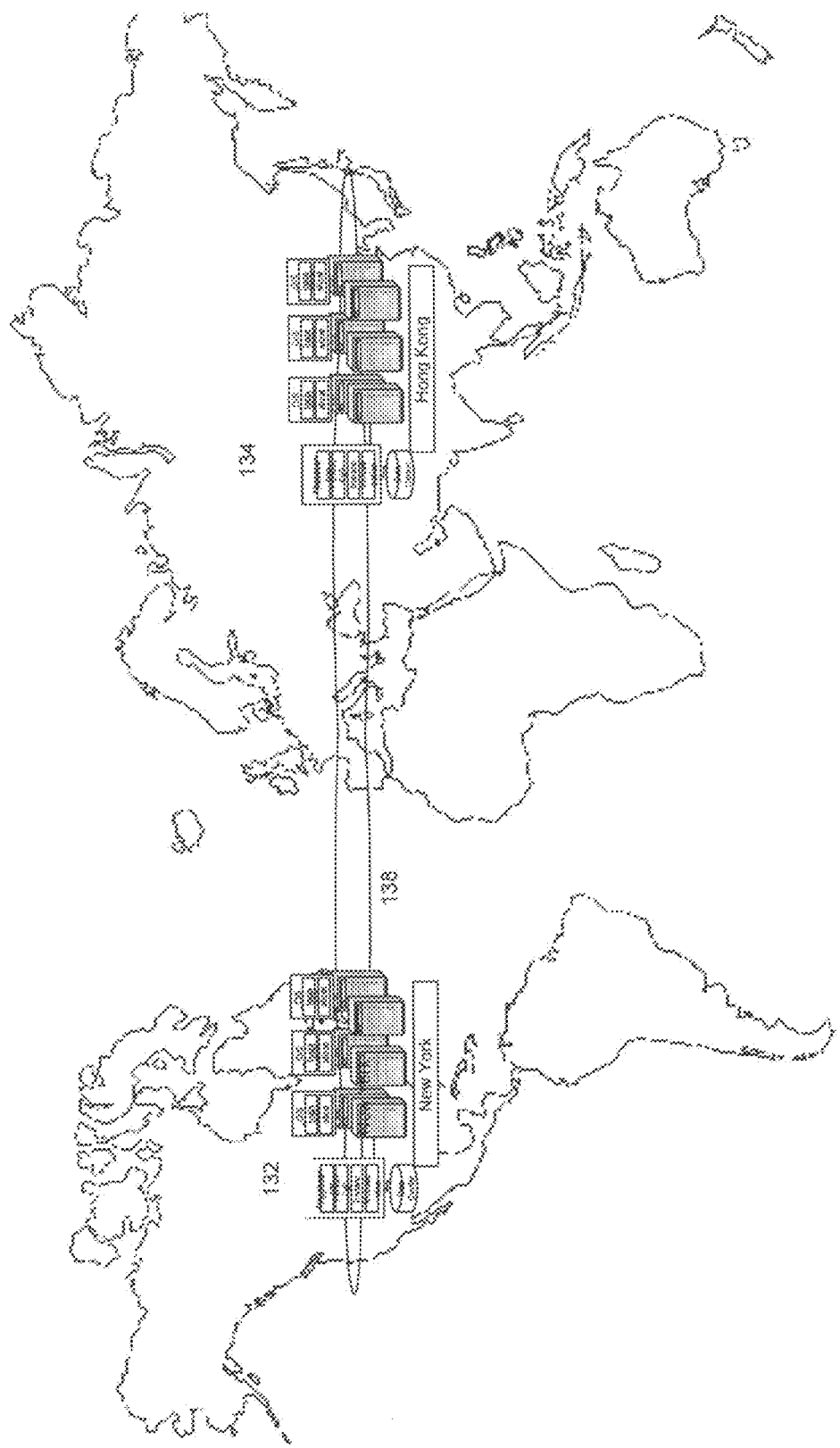
FIG. 3 shows an illustration of a layered application server system as it may be distributed across multiple data centers in accordance with an embodiment.

FIG. 3 shows an illustration of a layered application server system as it may be distributed across multiple data centers in accordance with an embodiment. As shown in FIG. 3, the application cloud 138 allows data centers to participate in sharing resources and providing an application.

For example, in the case of a stock trading application that typically requires substantial amounts of processing power, and is expected to handle hundreds of thousands of simultaneous transactions, the resources and application can be distributed over trading centers in New York 132 and Hong Kong 134. Each data center can share applications and draw upon the resources of its peer as necessary. When one trading center needs increased processing power to handle a set of tasks it can use the computing resources of the other trading center (if those resources are available) to help it to perform the tasks.

Figure 4:
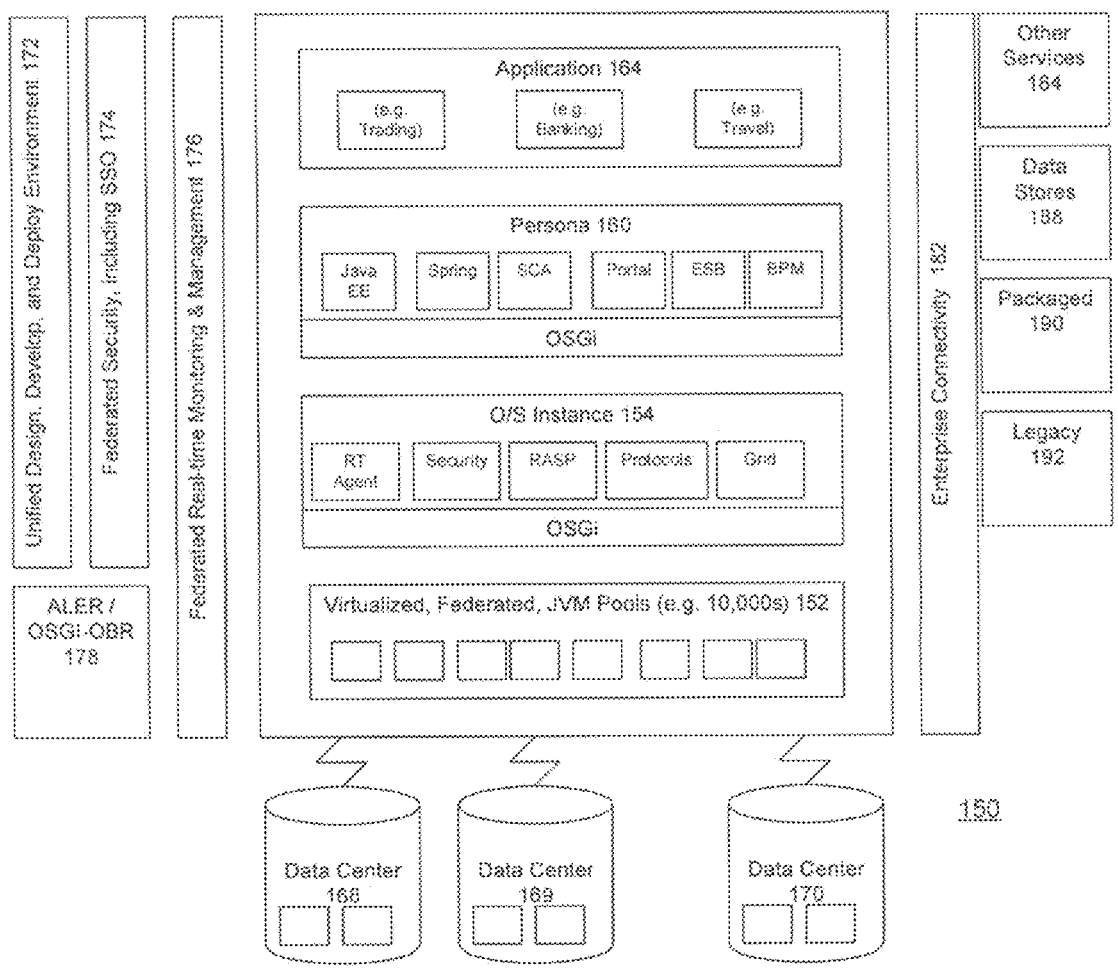
FIG. 4 shows an illustration of a system comprising a layered application server environment in accordance with an embodiment.

FIG. 4 shows an illustration of a system 150 comprising a layered application server environment in accordance with an embodiment. As shown in FIG. 4, data centers 168, 169, 170, spread over a plurality of locations (such as New York, London, Hong Kong, etc.) can be joined by a hardware fabric, complete with a server virtualization layer, security and entitlements layer, business and data layer, service oriented architecture (SOA) layer, containers, and management layer. This architecture can be used to provide a cloud of services composed of applications running on top of these services. All of this is then encapsulated into an Operating System Module (e.g. BEAOS) 154.

In accordance with an embodiment, each virtualized Java Virtual Machine (JVM) 152 includes an Operating System Module instance running on it. Each Operating System Module instance further includes one or more personality profiles 160, such as Java EE, Spring, SCA, etc. For example, a particular server may be a initially configured as a portal server, i.e. it may adopt a Portal persona, but then later switch to being configured as a BPM server, or adopt a BPM persona. Applications 164 can then be run to take advantage of the persona being used.

In accordance with an embodiment, the system can also comprise a unified design and development environment 172, federated security and SSO 174, federated real-time monitoring and management 176, and ALER/OSGI support 178. Additional embodiments can further provide enterprise connectivity 182, data stores 188, support for packaged applications 190 and legacy applications 192, and other services 184.

Figure 5:
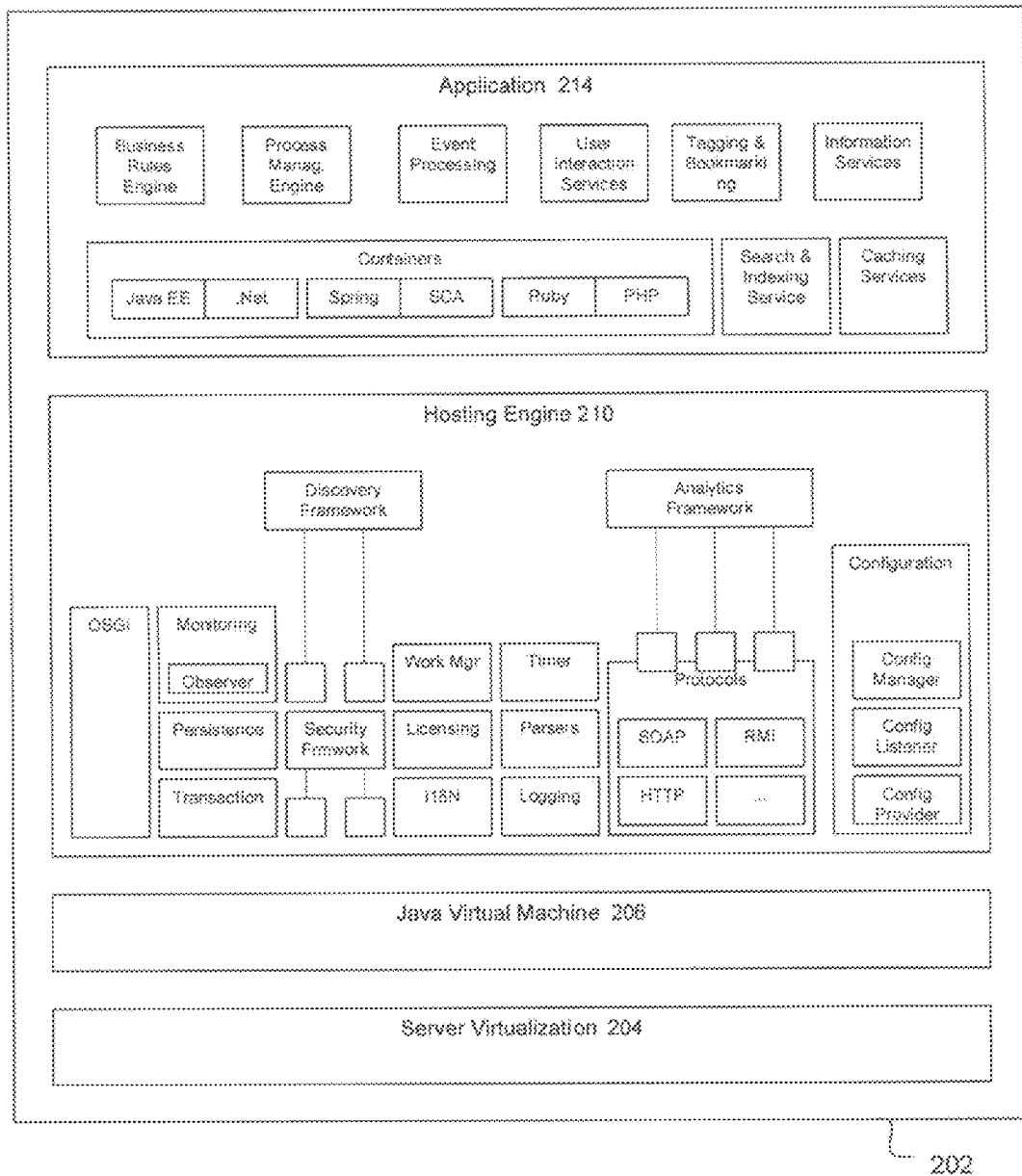
FIG. 5 shows another illustration of a system comprising a layered application server environment in accordance with an embodiment.

FIG. 5 shows another illustration of a system 202 comprising a layered application server environment in accordance with an embodiment. As shown in FIG. 5, each environment comprises a Java Virtual Machine 206, Server Virtualization Layer 204, Hosting Engine 210 (such as an Operating System Module or BEAOS), and Application Layer 214. As shown in FIG. 5, the environment allows for a lightweight component model that is distributed, highly available, reliable, scalable, and secure, with flexible protocol support, and that can be federated as a managed collection of components.

Figure 6:
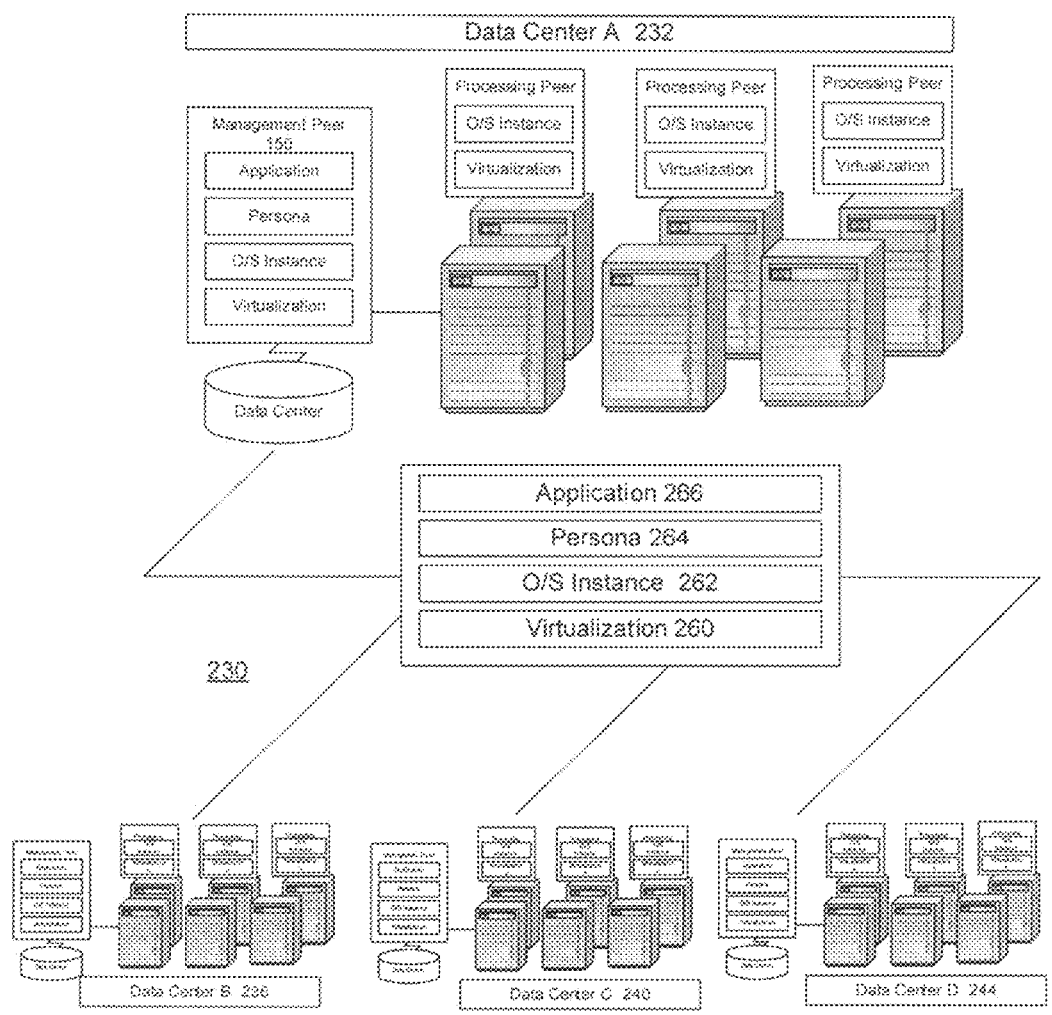
FIG. 6 shows an illustration of a layered application server system as it may be distributed across multiple data centers and provide an application persona in accordance with an embodiment.

FIG. 6 shows an illustration of a layered application server environment 230 as it may be distributed across multiple data centers and provide an application persona in accordance with an embodiment. As shown in FIG. 6, each of a plurality of data centers A 232, B 236, C 240 and D 244 host one or more layered application server environments or Hosting Engines (such as an Operating System Module or BEAOS instance). The data center provides a layered environment of virtualization 260, O/S instance 262, persona 264, and application layer 266. Each of the data centers, or other entities, can make use of the persona to run applications on other data centers.

Figure 7:
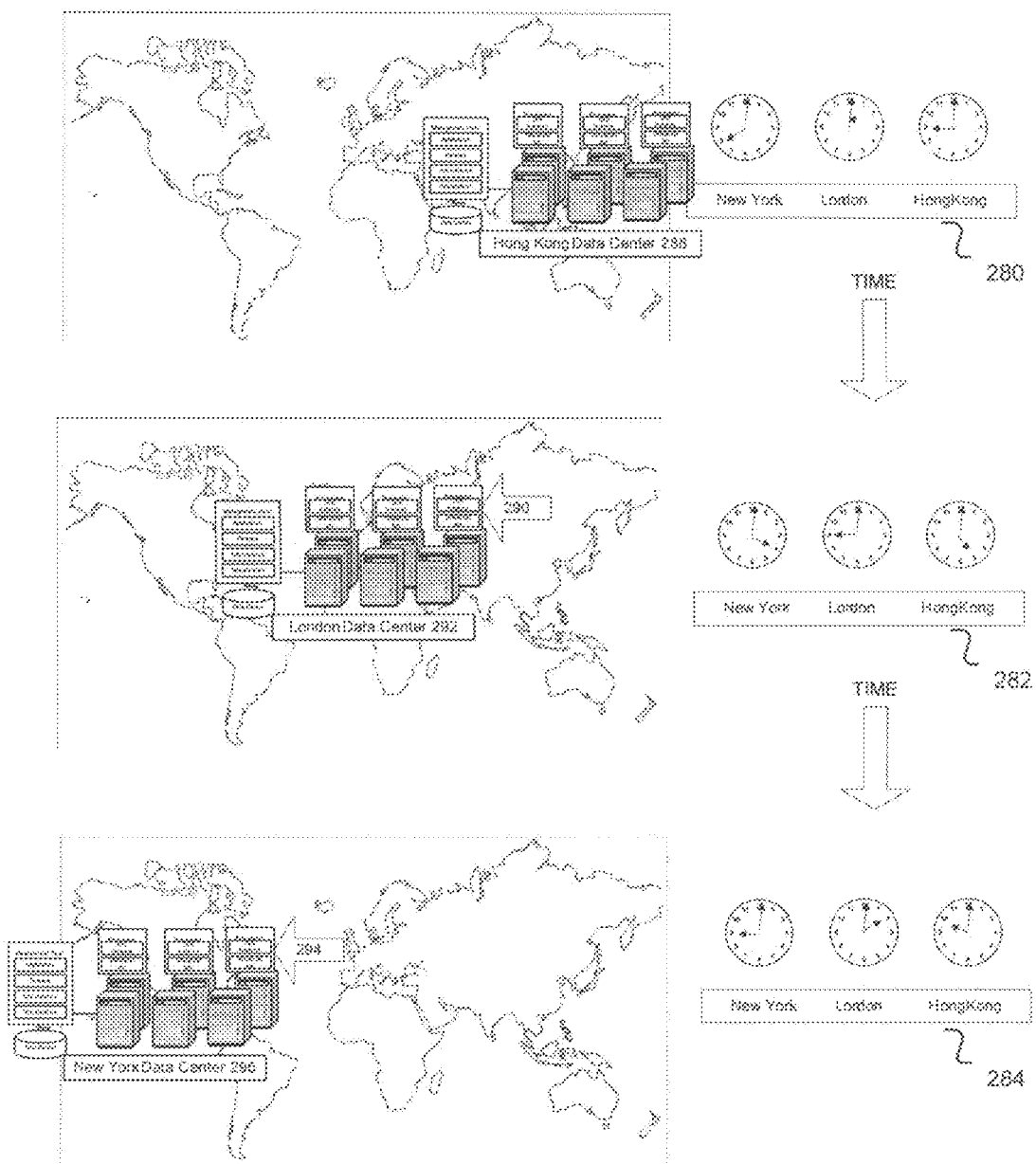
FIG. 7 shows an illustration of a layered application server system as it may be distributed across a global data center topology and configured to provide an application persona in accordance with an embodiment.

FIG. 7 shows an illustration of a layered application server system as it may be distributed across a global data center topology and configured to provide an application persona in accordance with an embodiment. As shown in FIG. 7 (using again the example of a stock trading application), here the resources and applications are distributed over trading centers in New York 296, London 292, and Hong Kong 288. As described above, each data center can share applications and draw upon the resources of its peer as necessary. Since stock trading is typically performed during the workday for a period of say 8 hours, then the systems in that stock trading location are typically extremely busy for that same period of time. However, after the close of the workday the systems are relatively underused. In accordance with an embodiment, the system allows processing power in some (currently underused) data centers to be made available to other (currently busy) data centers.

In the example shown in FIG. 7, when the stock market opens for trading 280 in Hong Kong, then the Hong Kong trading center 288 can be devoted to processing tasks for that location. As the day proceeds 282, and the Hong Kong trading center closes, the London trading center 292 opens for business. In accordance with an embodiment, the system allows processing power in the (currently underused, in this instance Hong Kong) data centers to be made available to other (currently busy, in this instance London) data centers. When the stock market opens for trading in London, then processing power from the Hong Kong data center can be transferred 290 to processing tasks for that location. Similarly, as the day continues further 284, and the London trading center closes, the New York trading center 296 opens for business. The system allows processing power in both the Hong Kong and London data centers to be made available 294 to, in this instance New York data centers. In this manner, processing power and resources can "follow" the trading day and the immediate needs of the enterprise as those needs vary in different regions and at different times of the day or for different needs.

Figure 8:
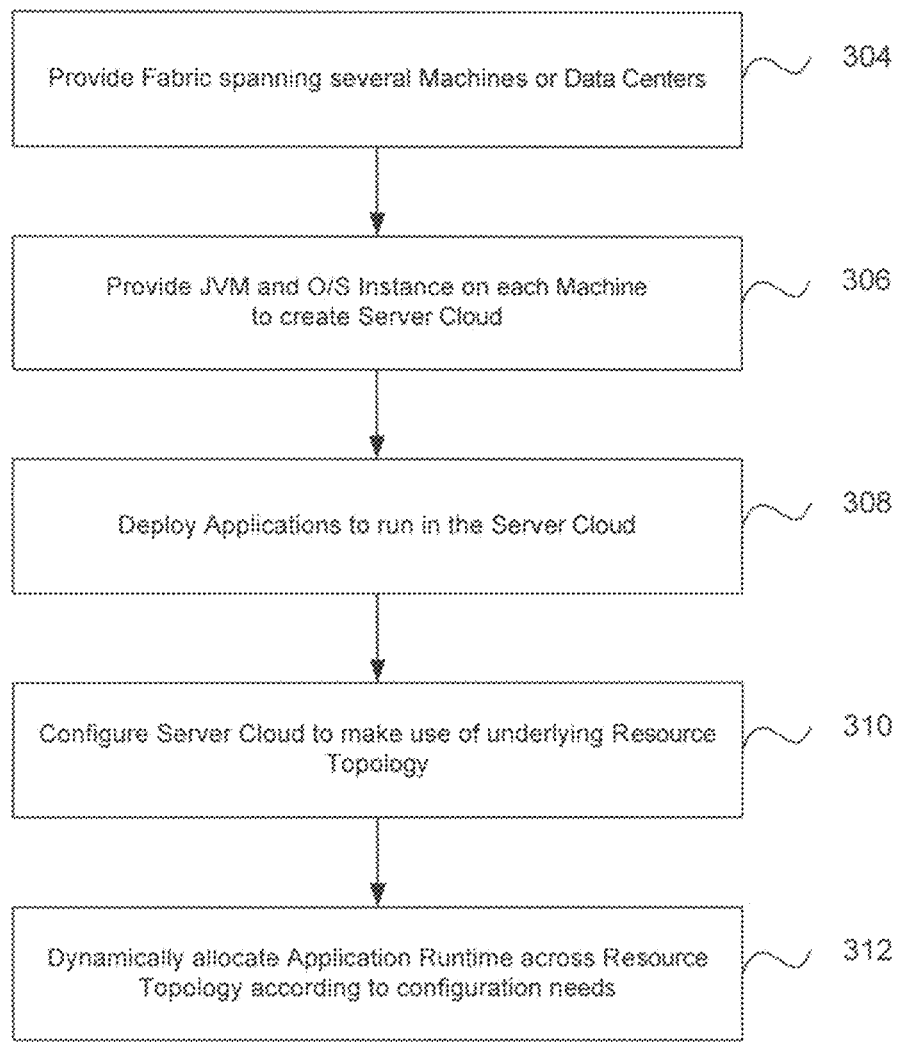
FIG. 8 shows a flowchart of a method for using a layered application server system to provide an application persona in accordance with an embodiment.

FIG. 8 shows a flowchart of a method for using a layered application server system to provide an application persona in accordance with an embodiment. As shown in FIG. 8, in step 304, a first step is to provide a fabric spanning sever machines or data centers, which as described above may include local machines, or data centers in other parts of the country, or in another country. In step 306, a Java Virtual Machine (JVM) and Operating System (O/S) instance is provided on each machine to create a server cloud. In step 308, an administrator can deploy applications to run in the server cloud. In step 310, the administrator can then configure the server cloud to make use of the underlying resource topology (for example the different data centers in different countries). In step 312, the system can dynamically allocate application runtime across resource topology according to configuration needs, for example to move processing capability for a particular application to one or more data centers for that particular time interval, or for other reasons.

In accordance with other embodiments, additional features can be provided, including:

Licensing models that allow for clouds of servers operating but waiting 24×7, so that additional servers can be used on demand to handle processor intensive tasks.

Means for allowing an operator or administrator to deploy applications to the cloud, and then further define what the configuration should be to best address load balancing.

A design tool that allows the operator to configure a topology that is then used to configure the system.

Separation of controls between data centers, including higher-grained security, trust, and control models.

Resources that can be defined statically or dynamically in response to real-time requirements.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

FIG. 8 shows a flowchart of a method for using a layered application server system to provide an application persona in accordance with an embodiment. As shown in FIG. 8, in step 304, a first step is to provide a fabric spanning several machines or data centers, which as described above may include local machines, or data centers in other parts of the country, or in another country. In step 306, a Java Virtual Machine (JVM) and Operating System (O/S) instance is provided on each machine to create a server cloud. In step 308, an administrator can deploy applications to run in the server cloud. In step 310, the administrator can then configure the server cloud to make use of the underlying resource topology (for example the different data centers in different countries). In step 312, the system can dynamically allocate application runtime across resource topology according to configuration needs, for example to move processing capability that is needed for a particular application to one or more data centers for that particular time interval, or for other reasons.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a BEA Systems, Inc., or WebLogic environment will be evident that the systems and techniques can be used with other types of application server, enterprise system, software platform, suite, or software product. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for layered application server processing, comprising:
   a plurality of computer servers or data centers, wherein each computer server or data center comprises a computer server hardware and a layered application server environment, including a Java virtual machine,
   a server virtualization layer that abstracts the Java virtual machine from the computer server hardware,
   one or more hosting engines that provide a modularized operating system instance,
   a personalization layer that enables different personas to be associated with the application server environment at that computer server or data center, and
   an application layer for executing Java-based software applications;
   wherein personas can be selectively adopted by the application server environments at the plurality of computer servers or data centers and used to provide a server cloud that is then used by a deployed Java-based software application to execute upon and share the resources of several computer servers or data centers, including, for each computer server or data center, configuring that computer server or data center to adopt a particular persona, and
   configuring the deployed software application to take advantage of the particular persona, so that processing of the deployed software application is distributed over those several computer servers or data centers which have the particular persona; and
   wherein each of the computer servers or data centers resources can be utilized by peer computer servers or data centers by configuring the server cloud to make use of an underlying computer server or data center resource topology, and
   dynamically allocating application runtime across the resource topology, to distribute processing capability as needed for a particular application across one or more of the peer computer servers or data centers, including dynamically moving processing capability as needed to the one or more peer computer servers or data centers, for a particular time interval.

2. The system of claim 1, wherein each of the one or more hosting engines provide an OSGi modularized operating system instance.

3. The system of claim 1, wherein each of the personas are one or more of Java Enterprise Edition or Spring.

4. The system of claim 1, wherein the plurality of computer servers or data centers personas are distributed over a plurality of different geographic locations, and wherein the Java-based software application is deployed to run within the cloud to take advantage of the particular persona, and is then processed by the plurality of computer servers or data centers in the different geographic locations having the particular persona.

5. The system of claim 4, wherein the Java-based software application deployed to run within the cloud and processed by the plurality of computer servers or data centers in the different geographic locations can be dynamically allocated to the different computer servers or data centers according to a configuration, and the available processing capability at the different geographic locations at different points in time.

6. The system of claim 1, wherein each of the peer computer servers or data centers shares applications and draws upon the resources of its peer as necessary, including wherein when one peer computer server or data center needs increased processing power to handle a set of tasks it can use the computing resources of another peer computer server or data center, if those resources are available, to help it to perform the tasks.

7. The system of claim 1, wherein the system includes one or more servers in a waiting state, so that additional servers can be used on demand to handle processor intensive tasks.

8. A method for layered application server processing, comprising the steps of:
    providing a plurality of computer servers or data centers, wherein each computer server or data center comprises a computer server hardware and a layered application server environment, including a Java virtual machine,
    a server virtualization layer that abstracts the Java virtual machine from the computer server hardware,
    one or more hosting engines that provide a modularized operating system instance,
    a personalization layer that enables different personas to be associated with the application server environment at that computer server or data center, and
    an application layer for executing Java-based software applications;
    wherein personas can be selectively adopted by the application server environments at the plurality of computer servers or data centers and used to provide a server cloud that is then used by a deployed Java-based software application to execute upon and share the resources of several computer servers or data centers, including, for each computer server or data center, configuring that computer server or data center to adopt a particular persona, and deploying a Java-based software application to run within the cloud, including configuring the deployed software application to take advantage of the particular persona, so that processing of the deployed software application is distributed over those several computer servers or data centers which have the particular persona; and
    wherein each of the computer servers or data centers resources can be utilized by peer computer servers or data centers by configuring the server cloud to make use of an underlying computer server or data center resource topology, and
    dynamically allocating application runtime across the resource topology, to distribute processing capability as needed for a particular application across one or more of the peer computer servers or data centers, including dynamically moving processing capability as needed to the one or more peer computer servers or data centers, for a particular time interval.

9. The method of claim 8, wherein each of the one or more hosting engines provide an OSGi modularized operating system instance.

10. The method of claim 8, wherein each of the personas are one or more of Java Enterprise Edition or Spring.

11. The method of claim 8, wherein the plurality of computer servers or data centers personas are distributed over a plurality of different geographic locations, and wherein the Java-based software application is deployed to run within the cloud to take advantage of the particular persona, and is then processed by the plurality of computer servers or data centers in the different geographic locations having the particular persona.

12. The method of claim 11, wherein the Java-based software application deployed to run within the cloud and processed by the plurality of computer servers or data centers in the different geographic locations can be dynamically allocated to the different computer servers or data centers according to a configuration, and the available processing capability at the different geographic locations at different points in time.

13. A non-transitory computer readable medium including instructions stored thereon which when read and executed by one or more computers cause the one or more computers to perform the steps comprising:
    providing a plurality of computer servers or data centers, wherein each computer server or data center comprises a computer server hardware and a layered application server environment, including a Java virtual machine,
    a server virtualization layer that abstracts the Java virtual machine from the computer server hardware,
    one or more hosting engines that provide a modularized operating system instance, a personalization layer that enables different personas to be associated with the application server environment at that computer server or data center, and
    an application layer for executing Java-based software applications;
    wherein personas can be selectively adopted by the application server environments at the plurality of computer servers or data centers and used to provide a server cloud that is then used by a deployed Java-based software application to execute upon and share the resources of several computer servers or data centers, including, for each computer server or data center, configuring that computer server or data center to adopt a particular persona, and
    deploying a Java-based software application to run within the cloud, including configuring the deployed software application to take advantage of the particular persona, so that processing of the deployed software application is distributed over those several computer servers or data centers which have the particular persona; and
    wherein each of the computer servers or data centers resources can be utilized by peer computer servers or data centers by
    configuring the server cloud to make use of an underlying computer server or data center resource topology, and
    dynamically allocating application runtime across the resource topology, to distribute processing capability as needed for a particular application across one or more of the peer computer servers or data centers, including dynamically moving processing capability as needed to the one or more peer computer servers or data centers, for a particular time interval.

14. The non-transitory computer readable medium of claim 13, wherein each of the one or more hosting engines provide an OSGi modularized operating system instance.

15. The non-transitory computer readable medium of claim 13, wherein each of the personas are one or more of Java Enterprise Edition or Spring.

16. The non-transitory computer readable medium of claim 13, wherein the plurality of computer servers or data centers personas are distributed over a plurality of different geographic locations, and wherein the Java-based software application is deployed to run within the cloud to take advantage of the particular persona, and is then processed by the plurality of computer servers or data centers in the different geographic locations having the particular persona.

17. The non-transitory computer readable medium of claim 16, wherein the Java-based software application deployed to run within the cloud and processed by the plurality of computer servers or data centers in the different geographic locations can be dynamically allocated to the different computer servers or data centers according to a configuration, and the available processing capability at the different geographic locations at different points in time.

* * * * *

UNITED STATES PATENT AND TRADEMARK OFFICE
CERTIFICATE OF CORRECTION

PATENT NO. : 8,838,669 B2
APPLICATION NO. : 12/366564
DATED : September 16, 2014
INVENTOR(S) : Cable It is certified that error appears in the above-identified patent and that said Letters Patent is hereby corrected as shown below:

In the Specification

In column 2, line 61, delete "VIRUAL" and insert -- VIRTUAL --, therefor.

In column 5, line 1, delete "sever" and insert -- several --, therefor.

In column 5, lines 38-55,
delete "FIG. 8 shows a flowchart of a method for using a layered application server system to provide an application persona in accordance with an embodiment. As shown in FIG. 8, in step 304, a first step is to provide a fabric spanning several machines or data centers, which as described above may include local machines, or data centers in other parts of the country, or in another country. In step 306, a Java Virtual Machine (JVM) and Operating System (O/S) instance is provided on each machine to create a server cloud. In step 308, an administrator can deploy applications to run in the server cloud. In step 310, the administrator can then configure the server cloud to make use of the underlying resource topology (for example the different data centers in different countries). In step 312, the system can dynamically allocate application runtime across resource topology according to configuration needs, for example to move processing capability that is needed for a particular application to one or more data centers for that particular time interval, or for other reasons." and
insert -- In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD -ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. --, therefor.

Signed and Sealed this
Seventeenth Day of March, 2015

Michelle K. Lee
*Director of the United States Patent and Trademark Office*